United States Patent
Baumann et al.

(10) Patent No.: US 10,821,635 B2
(45) Date of Patent: Nov. 3, 2020

(54) METHOD FOR PRODUCING AN INTERIOR TRIM PART OF A VEHICLE AND MOLDING TOOL

(71) Applicant: Faurecia Innenraum Systeme GmbH, Hagenbach (DE)

(72) Inventors: Bernhard Baumann, Lustadt (DE); Hugo Bonvalet, Karlsruhe (DE); Othmane Faik, La Wantzenau (FR); Lionel Hafer, Saint-Jean Rohrbach (FR); Alain Julien, Etupes (FR); Jean Ruiz, Scheibenhard (FR); Michael Walter, Karlsruhe (DE)

(73) Assignee: Faurecia Innenraum Systeme GmbH, Hagenbach (DE)

( * ) Notice: Subject to any disclaimer, the term of this patent is extended or adjusted under 35 U.S.C. 154(b) by 544 days.

(21) Appl. No.: 15/605,789

(22) Filed: May 25, 2017

(65) Prior Publication Data
US 2017/0341279 A1 Nov. 30, 2017

(30) Foreign Application Priority Data
May 26, 2016 (DE) .................. 10 2016 209 183

(51) Int. Cl.
*B29C 44/12* (2006.01)
*B29C 44/58* (2006.01)
(Continued)

(52) U.S. Cl.
CPC .......... *B29C 44/1233* (2013.01); *B29C 33/14* (2013.01); *B29C 44/10* (2013.01);
(Continued)

(58) Field of Classification Search
CPC ... B29C 44/1257; B29C 44/143; B29C 44/10; B29C 44/1233; B29C 44/586;
(Continued)

(56) References Cited

U.S. PATENT DOCUMENTS 4,114,213 A * 9/1978 Beernaerts ............... A47C 7/18
264/257
4,387,066 A * 6/1983 Pip ......................... B29C 44/083
249/160
(Continued)

FOREIGN PATENT DOCUMENTS

DE 2112652 A1 10/1971
DE 102016205031 A1 * 9/2017 ........... B32B 29/007
(Continued)

*Primary Examiner* — Atul P. Khare
(74) *Attorney, Agent, or Firm* — Faegre Drinker Biddle & Reath LLP

(57) ABSTRACT

A molding tool and method for producing an interior trim part. A cavity is embodied between a first element and a second element, and a slide is displaceably connected to the first element. A decorative layer is arranged on the first element and a backing is arranged on the second element. A foamable mixture is added to the hollow area between the backing and a reverse side of the decorative layer, such that a foam layer fills the hollow area. A distance between the first element and the second element is increased to enlarge the hollow area. During this process, the slide is pressed against a side facing away from the reverse side of the decorative layer, such that the hollow area is sealed with the reverse side of the decorative layer pressed against a lateral surface of the backing and/or against a lateral surface of the second element.

12 Claims, 3 Drawing Sheets

(51) Int. Cl.
  *B29C 44/34* (2006.01)
  *B29C 33/14* (2006.01)
  *B29C 44/14* (2006.01)
  *B29C 45/14* (2006.01)
  *B29C 44/10* (2006.01)
  *B29C 53/04* (2006.01)
  *B29L 31/30* (2006.01)
  *B29K 75/00* (2006.01)
  *B29K 105/04* (2006.01)

(52) U.S. Cl.
  CPC ........ *B29C 44/1257* (2013.01); *B29C 44/143* (2013.01); *B29C 44/351* (2013.01); *B29C 44/58* (2013.01); *B29C 44/586* (2013.01); *B29C 45/14508* (2013.01); *B29C 53/04* (2013.01); *B29C 44/1228* (2013.01); *B29C 2045/14204* (2013.01); *B29K 2075/00* (2013.01); *B29K 2105/04* (2013.01); *B29K 2995/0063* (2013.01); *B29L 2031/3005* (2013.01)

(58) Field of Classification Search
  CPC .......... B29C 33/14; B29C 2045/14204; B29C 45/14508; B29C 53/04
  See application file for complete search history.

(56) References Cited

U.S. PATENT DOCUMENTS

| | | | | |
|---|---|---|---|---|
| 4,793,784 | A | 12/1988 | Belleville et al. | |
| 4,968,474 | A * | 11/1990 | Ito | B29C 45/1418 264/257 |
| 4,992,224 | A * | 2/1991 | Swenson | B29C 44/1257 264/46.6 |
| 5,006,288 | A * | 4/1991 | Rhodes, Jr. | B29C 33/14 264/219 |
| 5,372,491 | A * | 12/1994 | Fritsch | B29C 45/1639 264/314 |
| 5,500,168 | A * | 3/1996 | Suzuki | B29C 33/14 264/278 |
| 5,500,169 | A * | 3/1996 | Kondo | B29C 33/14 264/46.5 |
| 5,618,477 | A * | 4/1997 | Suzuki | B29C 44/1238 264/46.5 |
| 5,709,828 | A | 1/1998 | Bemis et al. | |
| 5,976,289 | A * | 11/1999 | Kawakubo | B29C 44/1257 156/78 |
| 6,103,348 | A * | 8/2000 | Scharrenberg | B29C 45/14508 428/192 |
| 6,126,769 | A * | 10/2000 | Scharrenberg | B29C 45/14196 156/156 |
| 6,854,783 | B2 * | 2/2005 | Teranishi | B60K 37/00 296/70 |
| 7,147,809 | B2 * | 12/2006 | Cowelchuk | B29C 44/1257 264/46.5 |
| 7,332,207 | B2 * | 2/2008 | Bondar | B29C 44/1257 428/71 |
| 8,506,003 | B2 * | 8/2013 | Smith | B29C 44/086 296/146.7 |
| 9,493,124 | B2 * | 11/2016 | Vasilj | B29C 44/1233 |
| 10,016,916 | B2 * | 7/2018 | Simard | B29C 44/3403 |
| 2004/0166302 | A1 * | 8/2004 | Lee | B29C 44/1257 428/304.4 |

FOREIGN PATENT DOCUMENTS

| | | | | |
|---|---|---|---|---|
| EP | 1097794 A1 * | 5/2001 | .......... | B29C 51/428 |
| EP | 1857245 A2 * | 11/2007 | ......... | B29C 44/1257 |
| FR | 2979569 A1 * | 3/2013 | .......... | B29C 44/586 |
| FR | 2979569 A1 | 3/2013 | | |
| JP | 02155709 A * | 6/1990 | ....... | B29C 45/14196 |
| WO | WO-0050211 A1 * | 8/2000 | ....... | B29C 45/14336 |

* cited by examiner

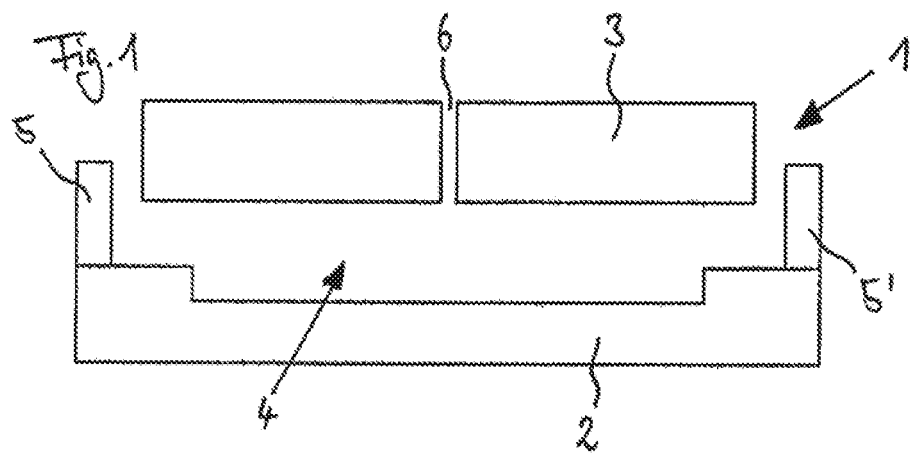
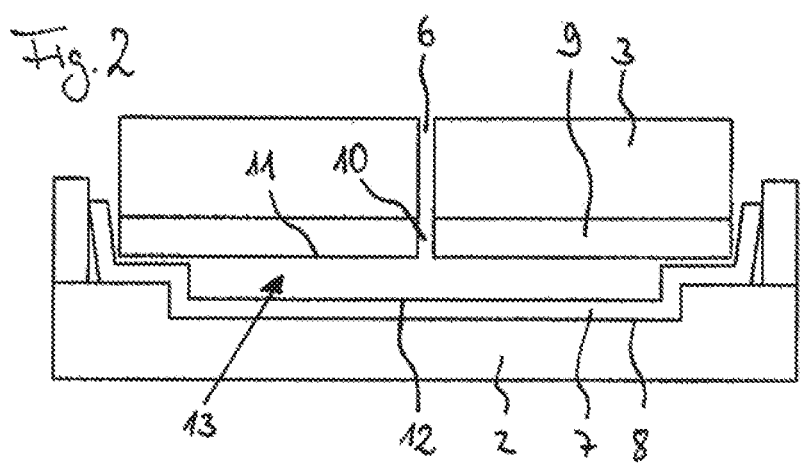
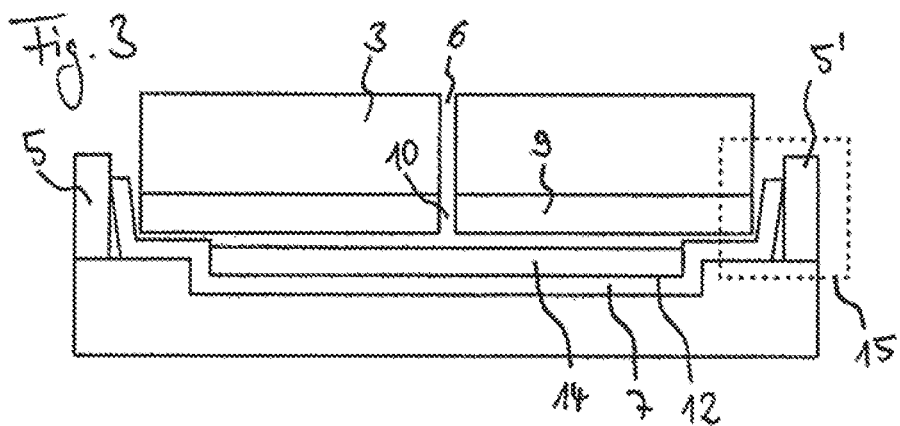

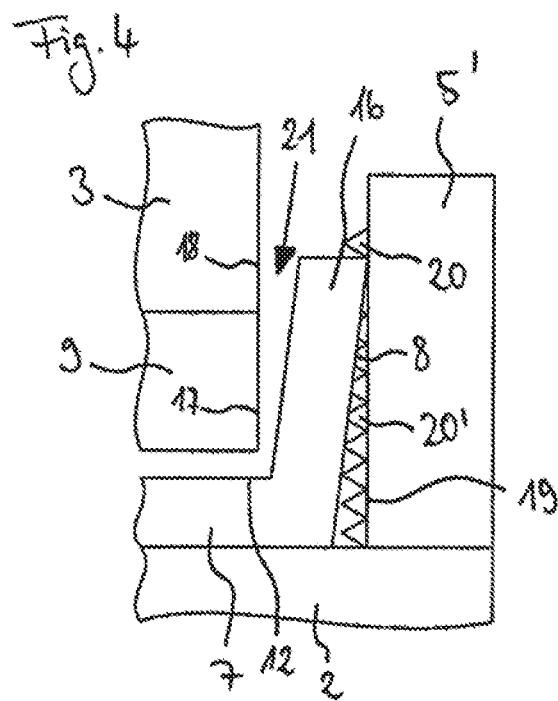
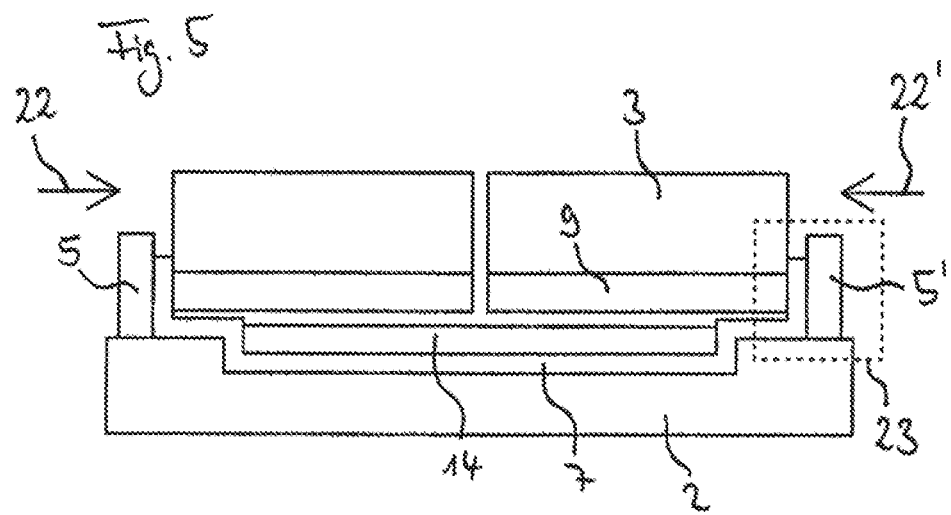

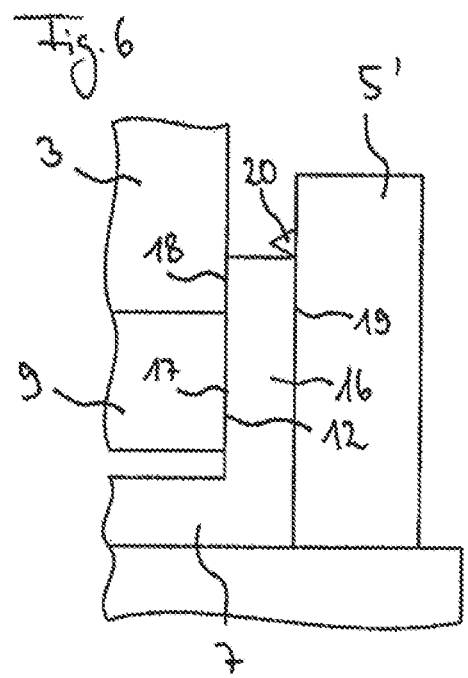
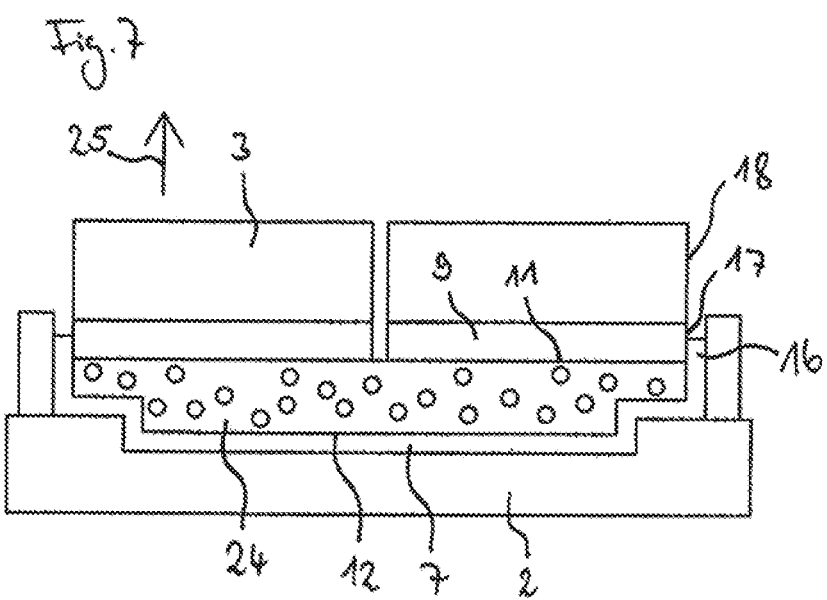

METHOD FOR PRODUCING AN INTERIOR TRIM PART OF A VEHICLE AND MOLDING TOOL

CROSS-REFERENCE TO RELATED APPLICATION

This application claims priority to German Application No. 10 2016 209 183.2, filed May 26, 2016, which is herein incorporated by reference in its entirety.

TECHNICAL FIELD

The application relates to a method for producing an interior trim part of a vehicle. In addition, the application relates to a molding tool for producing an interior trim part of a vehicle.

BACKGROUND

Methods for producing interior trim parts of a vehicle that have a cover layer, a backing, and a foam layer arranged between the cover layer and backing, are known from the prior art. For example, FR 2 979 569 A1 describes a method in which first a molding tool is provided that has a lower and an upper molding tool part. Then the previously produced cover layer is arranged on the lower molding tool part and the backing, also produced previously, is attached to the upper molding tool part. The molding tool is typically embodied such that the backing and the cover layer in the resulting arrangement are not in direct contact with one another so that a hollow area is formed between the backing and the cover layer. The upper molding tool part and the backing may each have an opening through which a liquid foamable mixture may be added to the hollow area. Then a period of time may be allowed to pass so that the mixture has foamed completely and hardened so that it forms the foam layer that fills the empty space and connects the backing to the cover layer. Typically the volume of the foamable mixture increases by five to ten-fold during the foaming process. While the foam layer is being formed, the lower molding tool part may be moved downward relative to the upper molding tool part so that a height of the hollow area is enlarged during the foaming process. In a last step, the finished interior trim part of a vehicle may be removed from the molding tool.

This method is suitable for producing a vehicle interior trim part having a thin foam layer that has a low foam density. In this way it is possible to achieve advantageous savings in the weight of the vehicle interior trim piece.

However, inhomogeneities may occur in the foam layer if there is air present in the hollow area or if gaseous reaction products that may occur during the foaming process cannot reliably escape from the hollow area.

SUMMARY

In a method for producing an interior trim part of a vehicle, first a molding tool comprising a first molding tool element, a second molding tool element, and a slide is prepared. A cavity is formed between the first molding tool element and the second molding tool element. The slide is displaceably connected to the first molding tool element. Then a decorative skin or decorative layer having a visible side of the decorative skin is arranged on the first molding tool element and a backing is arranged on or attached to the second molding tool element. A hollow area is formed between the backing and a reverse side of the decorative skin. Then a foamable mixture is added to the hollow area. In a further step, the mixture foams such that a foam layer that fills the hollow area is formed. Prior to or during the foaming process, a distance between the first molding tool element and the second molding tool element is increased so that the hollow area is enlarged. During this enlarging process, the slide is pressed against a side facing away from the reverse side of the decorative skin or against the visible side of the decorative skin such that the hollow area is sealed in that the reverse side of the decorative skin is pressed against a lateral surface of the backing and/or against a lateral surface of the second molding tool element or in that the reverse side of the decorative skin, or at least an area thereof, touches the lateral surface of the backing and/or the lateral surface of the second molding tool element.

The foaming process is accompanied by an increase in the volume of the mixture, for instance a five to ten-fold increase in volume of the mixture. Moreover, the viscosity of the mixture increases sharply during the foaming process. Since the distance between the molding tool elements is smaller during the filling process, a smaller volume of air must escape from the hollow area while the foamable mixture is being added. During this, it may be provided that the distance when adding the foamable mixture should be selected such that the foamable mixture fills at least 50 percent of the hollow area, or for instance, nearly completely fills the hollow area. A relatively low density of the foam layer may be attained compared to production methods that provide a fixed distance between the first molding tool element and the second molding tool element. In embodiments, the foam layer has a density of at most 200 g/L, preferably at most 150 g/L or at most 100 g/L.

Thus using this method it is possible to produce a comparatively light-weight vehicle interior trim part that comprises the flat backing, the foam layer, and the decorative skin, wherein the decorative skin is spaced apart from the backing. Arranged between the decorative skin and the backing is the foam layer, which is joined to the backing and the reverse side of the decorative skin. Due to the foam layer that is arranged between backing and the decorative skin, esthetically attractive, soft haptics are produced when a vehicle occupant touches the decorative skin on its visible side.

In embodiments, after the foaming process of the mixture the hollow area has a height of at least 2 mm, preferably at least 4 mm, and/or at least 15 mm, preferably at most 8 mm. In undercut areas, after the foaming process of the mixture the hollow area, however, the hollow area may also have a height of at most 40 mm, preferably at most 20 mm. The height of the hollow area corresponds to a thickness of the foam layer that is to be produced.

The second molding tool element typically has an opening that is connected to the cavity for adding or introducing the foamable mixture to the hollow area. The mixture may be added by means of a known filling device, for instance a metering filling device.

The foamable or foam-forming mixture is typically added to the hollow area in the liquid state, preferably the low-viscosity liquid state. In this way, the foamable mixture reliably distributes in the hollow area such that an undesired densification of the mixture during the foaming process in an area and formation of undesired air pockets in the foam layer may be prevented. It is typically provided that, during or after the foamable mixture is added to the hollow area, the foamable mixture is arranged on the reverse side of the decorative skin facing away from the visible side of the decorative skin. It may be provided that the first forming tool element is arranged beneath the second forming tool element. In this case the liquid foamable mixture may distribute on the reverse side of the decorative skin due to gravity. In addition or alternatively, the liquid foamable mixture may distribute on the reverse side of the decorative skin due to a filling pressure.

The foamable mixture is typically a reactive mixture, for instance a foamable polymer. For instance, the mixture may have a plurality of chemical compounds that react with one another chemically such that gases are formed that cause foaming. For instance, the mixture may be a mixture for forming polyurethane. It may include, for instance, at least one isocyanate, at least one polyol, and water. A reaction between the isocyanate and the polyol may lead to the formation of the polyurethane, while carbon dioxide is released by a reaction between the isocyanate and the water.

The visible side of the decorative skin does not have to be visible at all times and in all areas. The visible side shall merely be construed to mean that this side of the decorative skin is oriented towards the interior of the vehicle when the vehicle interior trim part is used properly.

The disclosure also relates to a molding tool for producing the vehicle interior trim part, the molding tool having the decorative trim, the backing, and the foam layer arranged between the decorative skin and the backing. The molding tool comprises the first molding tool element and the second molding tool element, wherein the cavity is formed between the first molding tool element and the second molding tool element. The backing may be arranged on or attached to the second molding tool element and the visible side of the decorative skin may be arranged on the first molding tool element such that the hollow area is formed between the backing and the reverse side of the decorative skin. The foamable mixture may be added to the hollow area and the second molding tool element may be moved relative to the first molding tool element such that the hollow area may be enlarged prior to and/or during the foaming process of the foamable mixture. The molding tool furthermore comprises the at least one slide, which is displaceably connected to the first molding tool element. The slide is set up to press against the side facing away from the reverse side of the decorative skin, or the visible side of the decorative skin, during a movement of the second molding tool element relative to the first molding tool element such that the hollow area is sealed in that the reverse side of the decorative skin is pressed against the lateral surface of the backing and/or against the lateral surface of the molding tool element.

Using the method and the molding tool described in this disclosure, the hollow area may be reliably sealed in that the slide presses against the decorative skin. In particular, the hollow area may also be reliably sealed while the distance is increased. In this way it is possible, for instance, to prevent foam from exiting from the hollow area as a result of the increase in volume during the foaming process. The method and the molding tool described in this disclosure therefore permit savings in materials during the production of interior trim parts of a vehicle, since a smaller quantity of the foamable mixture may be used. Moreover, there is no need for an additional processing step in the form of separating foam that may have escaped from the hollow area.

Another advantage of the method and the molding tool described in this disclosure is that it permits the sealing of the hollow area while the distance between the first molding tool element and the second molding tool element is increased with decorative skin lying smooth on the second molding tool element. This advantage is not achieved with known methods, such as, for instance, in the publication FR 2 979 569 A1. In the known method, the cover layer necessarily creates waves in the edge areas of the hollow area when the distance between the lower and the upper molding tool part is slight. It is not until the height of the hollow area increases that the cover layer lies smoothly against the lower molding tool part. Making waves in the cover layer may have a negative effect on the quality of the foam layer to be formed.

In the method, the decorative skin is typically arranged with an edge area of the decorative skin between the slide and the lateral surface of the backing and/or the lateral surface of the second molding tool element after the decorative skin has been arranged on the first tool element. As a rule, one direction in one plane of the edge area of the decorative skin runs essentially parallel to a movement direction of the second molding tool element relative to the first molding tool element when the slide presses on the decorative skin. In embodiments, the surfaces of the backing and/or of the second molding tool, against which the slide presses, are essentially oriented and embodied such that a normal vector that is perpendicular on the surfaces is oriented perpendicular to the movement direction in a plurality of or all areas of the surfaces. As a rule, the surfaces against which the slide presses are embodied essentially not curved and/or without stages in the movement direction.

The slide may be displaced electrically, hydraulically, or pneumatically, for instance. In embodiments it is provided that the slide is translationally displaceable, at least in part, and especially is exclusively translationally or essentially translationally displaceable. In this manner it may be achieved that when pressing the slide against the decorative skin a pressure is distributed as uniformly as possible across a surface of the decorative skin. In embodiments it is provided that the slide presses in a direction that is oriented essentially perpendicular to the movement direction of the second molding tool element relative to the first molding tool element while the distance is being increased.

In embodiments, the reverse side of the decorative skin slides along on the lateral surface of the backing and/or of the lateral surface of the second molding tool element when the slide is pressed.

A plurality of slides may be provided. These are then typically arranged in the positions running laterally around the hollow area. The slides then typically press inward to seal the hollow area. In addition to the slide or slides, additional sealing elements, which may be elastically deformable, may be provided running around the hollow area.

A surface of the slide in contact with the decorative skin when the slide is pressed against the side facing away from the reverse side of the decorative skin or the visible side of the decorative skin may have elevations for reinforcing static friction between the decorative skin and the slide. The elevations may be in the form of teeth or wrinkling. Typically static friction is increased between the side of the decorative skin facing away from the reverse side or between the visible side of the decorative skin and the slide such that it is greater than friction between the reverse side of the decorative skin and the lateral surface of the second molding tool element and/or the backing. What this achieves is that, while the distance between the first and the second molding tool element is being increased, the decorative skin does not displace due to adhesion to the lateral surface of the second molding element and/or of the backing.

In embodiments it is provided that the surface of the slide in contact with the decorative skin when the slide is pressed and the lateral surfaces of the second molding tool element or of the backing do not engage in one another. In addition, as a rule, while being pressed these surfaces do not have any overlap in the direction of movement of the second molding tool element that limits or prevents the freedom of movement of the second molding tool. What this achieves is that the second molding tool is reliably displaceable relative to the first molding tool element, even while the slide is being pressed against the decorative skin. In particular, during pressing, as a rule these surfaces do not have any mutually corresponding elevations or depressions that would limit the freedom of movement of the molding tool elements relative to one another.

Typically the distance between the first molding tool element and the second molding tool element prior to the foaming or during the foaming process increases until a resulting height of the hollow area corresponds to a thickness of the foam layer to be produced.

It may be provided in embodiments that the reverse side of the decorative skin is pressed by the slide against the lateral surface of the backing, and not against the lateral surface of the second molding tool element, as soon as the resulting height is reached. This is typically reached in that a size and positioning of the decorative skin on the first molding tool element are appropriately selected. In this case the sealing action is effected by the edge area of the decorative skin such that, after the foam layer has formed, no overhanging areas of the decorative skin have to be separated, for instance by punching.

Because of this it is possible to save one method step while producing the interior trim part of a vehicle. This results in savings in materials, as well.

Using the method and the molding tool described in this disclosure the hollow area may also be deaerated in a controlled manner, in addition to the sealing described in the foregoing. For instance, the hollow area may be deaerated while the foamable mixture is being added to the hollow area. The hollow area is deaerated in that the slide is displaced to a withdrawn position or is left in a withdrawn position. In this way, air or gaseous reaction products, for instance, may escape through a gap possibly formed between the reverse side of the decorative skin and the second molding tool part or through a gas-permeable channel.

The application furthermore relates to an interior trim part of a vehicle that was produced according to the method described here.

The decorative skin is typically a slush skin. These may be produced relatively inexpensively using known methods and may be visually attractive. In other embodiments, however, it is also possible for the decorative skin to be embodied using another layer known from the prior art, for instance using a different plastic layer (PU spray skin, deep-draw film, IMG film) or a leather layer. The backing may be embodied, for instance, as an injection molding part made of plastic.

The features cited in the foregoing regarding the method for producing the vehicle interior trim part may be applied to the molding tool for producing the vehicle interior trim part. Moreover, the features cited in the foregoing regarding the molding tool for producing the vehicle interior trim part may be applied to the method for producing the vehicle interior molding part.

While multiple embodiments are disclosed, still other embodiments of the present disclosure will become apparent to those skilled in the art from the following detailed description, which shows and describes illustrative embodiments of the disclosure. Accordingly, the drawings and detailed description are to be regarded as illustrative in nature and not restrictive.

BRIEF DESCRIPTION OF THE DRAWINGS

Embodiments of the disclosure shall be described using the following figures.

FIG. 1 depicts a molding tool, according to embodiments of the disclosure;

FIG. 2 is a schematic view during a method step in the production of an interior trim part of a vehicle, according to embodiments of the disclosure;

FIG. 3 is a schematic view during another method step in the production of the interior trim part of a vehicle, according to embodiments of the disclosure;

FIG. 4 is an enlarged depiction of an area in FIG. 3;

FIG. 5 is a schematic view during another method step in the production of the interior trim part of a vehicle, according to embodiments of the disclosure;

FIG. 6 is an enlarged depiction of an area in FIG. 5; and

FIG. 7 is a schematic view during another method step in the production of the interior trim part of a vehicle, according to embodiments of the disclosure.

DETAILED DESCRIPTION

FIG. 1 depicts a molding tool 1. The molding tool 1 comprises a first molding tool element 2 and a second molding tool element 3. A cavity 4 is formed between the first molding tool element 2 and the second molding tool element 3. The cavity 4 is delimited on a top side by the second molding tool element 3 and on a bottom side by the first molding tool element 2.

The molding tool 1 also comprises two slides 5, 5', which are each displaceably connected to the first molding tool element 2. The slides 5, 5' laterally delimit the cavity 4 and in the depicted embodiment are linearly displaceable to the left and right. Displacement of the slides 5, 5' may be driven, for instance, by an electric motor (not shown).

In addition, the second molding tool element 3 may be displaced upward and downward relative to the first molding tool element 2 such that a height of the cavity 4 may be increased by displacing the second molding tool element 3 upward.

In a central area, the second molding tool element 3 has an opening 6 that is provided for adding a foamable mixture to the cavity 4. A filling device (not shown) may be connected to the second molding tool element 3 in the area of the opening 6 for this purpose.

FIG. 2 depicts a method step during the production of an interior trim part of a vehicle. Features that recur in this and subsequent figures are provided with the same reference numbers. A decorative skin 7 has been arranged on the first molding tool element 2 such that a visible side 8 of the decorative skin 7 faces the first molding tool element 2. The decorative skin 7 is a slush skin, for instance.

Moreover, a backing 9 has been attached to the second molding tool element 3. The backing 9 is extended flat horizontally and is produced as an injection molding part made of plastic. In a center area the backing 9 has an opening 10. The backing 9 is embodied and arranged such that the opening 10 of the backing 9 overlaps the opening 6 of the second molding tool element 3.

The backing 9 and the decorative skin 7 do not completely fill the cavity 4. Instead, a bottom side 11 of the backing 9 and a reverse side 12 of the decorative skin 7 are spaced apart from one another such that a hollow area 13 is formed between the backing 9 and the decorative skin 7.

FIG. 3 depicts another method step in the production of the interior trim part of a vehicle. For forming a foam layer, first a liquid foamable mixture 14 is added from above to the hollow area 13 between the backing 9 and the decorative skin 7 through the opening 6 of the second molding tool element 3 and through the opening 10 of the backing 9. Because of gravity and/or injection pressure, the liquid foamable mixture 14 distributes on the reverse side 12 of the decorative skin 7 and fills, for example, about 65 percent of the volume of the hollow area 13. The foamable mixture 14 is, for example, a reactive foamable polymer that is set up to react to polyurethane.

While the foamable mixture 14 is being added to the hollow area 13, the slides 5, 5' are in an opened or withdrawn position, i.e., the left slide 5 has been displaced to the left and the right slide 5' has been displaced to the right.

FIG. 4 depicts and enlarged view of an area of the arrangement depicted in FIG. 3 and identified with the reference number 15. The decorative skin 7 has been arranged on the first molding tool element 2 such that the decorative skin 7 is oriented nearly vertical in an edge area 16. The edge area 16 of the decorative skin 7 is laterally enclosed by the slide 5' and a lateral surface 17 of the backing 9 and a lateral surface 18 of the second molding tool element 3.

An area of the visible side 8 or the side of the decorative skin 7 facing away from the reverse side 12 is positioned against a surface 19 of the slide 5'. At this surface 19 the slide has elevations, of which two are identified with reference numbers 20 and 20' as examples.

Formed between the reverse side 12 of the decorative skin 7 and the lateral surface 17 of the backing 9 or of the lateral side 18 of the second molding element 13 is a gap 21. Air escapes from the hollow area 13 through the gap 21 when the foamable mixture 14 is added to the hollow area 13.

Once a desired quantity of the foamable mixture 14 has been added to the hollow area 13, the slides 5, 5' are displaced inwardly, as is indicated in FIG. 5 by the arrows labeled with reference numbers 22 and 22'.

FIG. 6 depicts an enlarged view of the area identified in FIG. 5 with reference number 23. The edge area 16 of the decorative skin 7 is pressed to the left by the displacement of the slide 5'. This presses the reverse side 12 of the decorative skin 7 in the edge area 16 against the lateral surface 17 of the backing 9 and against the lateral surface 18 of the second molding tool element 13. Thus the gap 21 is closed and the hollow area 13 is sealed.

In another method step, the previously liquid foamable mixture 14 foams. During the foaming process, the second molding tool element 3, together with the backing 9, is moved upward, so that the cavity 4 and the hollow area 13 enlarge. It may also be provided that the second molding tool element 3, together with the backing 9, is moved upward even prior to the foaming process. During the foaming process, the slides 5, 5' remain in the position illustrated in FIG. 6, so that the hollow area 13 remains sealed.

FIG. 7 depicts the arrangement at a point in time after the second molding tool 3 has been moved upward in the direction of the arrow labeled with the reference number 25. The cavity 4 is enlarged in this manner until a height of the hollow area 13 corresponds to a desired thickness of a foam layer 24 to be produced. In this arrangement, the reverse side 12 of the decorative skin 7 is merely pressed against the lateral surface 17 of the backing 9, but not against the lateral surface 18 of the second molding tool element 3.

The foam layer 24 is formed from the previously liquid foamable mixture 14 due to the foaming process. During the foaming process, the volume of the mixture 14 increases so that the foam layer 24 in the example depicted completely fills the hollow area 13. During the foaming process, the foam layer 24 is connected to the bottom side 11 of the backing 9 and to the reverse side 12 of the decorative skin 7. The increase in the volume of the mixture is associated with a decrease in the density of the mixture so that the foam layer 24 has a comparatively low density of, for instance, less than 150 g/L.

While the distance between the first molding tool element 2 and the second molding tool element 3 is increasing, the reverse side 12 of the decorative skin 7 in the edge area 16 of the decorative skin 7 slides along on the lateral surface 17 of the backing 9 and along the lateral surface 18 of the second molding tool element 3, wherein the lateral surfaces 17, 18 move upward. The elevations 20, 20' on the surface 19 of the slide 5' produce sufficient static friction between the slide 5' and the decorative skin 7 so that the latter does not move relative to the slide 5' or moves only slightly.

In another step, the finished interior trim part of a vehicle, which comprises the decorative skin 7, the foam layer 24, and the backing 9, may be removed from the molding tool 1.

Features of the various embodiments may be combined with one another and claimed individually.

Various modifications and additions can be made to the exemplary embodiments discussed without departing from the scope of the present disclosure. For example, while the embodiments described above refer to particular features, the scope of this disclosure also includes embodiments having different combinations of features and embodiments that do not include all of the described features. Accordingly, the scope of the present disclosure is intended to embrace all such alternatives, modifications, and variations as fall within the scope of the claims, together with all equivalents thereof.

We claim:

1. A method for producing an interior trim part of a vehicle, the method comprising:
   providing a molding tool comprising a first molding tool element, a second molding tool element, and a slide, wherein a cavity is formed between the first molding tool element and the second molding tool element and wherein the slide is displaceably connected to the first molding tool element;
   arranging a decorative skin with a visible side of the decorative skin on the first molding tool element and arranging a backing on the second molding tool element such that a hollow area is formed between the backing and a reverse side of the decorative skin facing away from the visible side of the decorative skin;
   pressing the reverse side of the decorative skin against a lateral surface of the backing by displacing the slide along the first molding tool element so as to seal the hollow area;
   adding a foamable mixture to the hollow area;
   foaming the mixture such that a foam layer that fills the sealed hollow area is formed; and
   increasing a distance, in a direction that is different from a displacement direction of the slide, between the first molding tool element and the second molding tool element prior to and/or during the foaming process, so that the hollow area is enlarged by sliding the lateral surface of the backing along the reverse side of the decorative skin.

2. The method according to claim 1, characterized in that the reverse side of the decorative skin slides along on the lateral surface of the backing and a lateral surface of the second molding tool element during the increasing.

3. The method according to claim 1, characterized in that, during the increasing of the distance, the displacement direction of the slide is essentially perpendicular to the direction that is different from the displacement direction of the slide.

4. The method according to claim 1, characterized in that a surface of the slide in contact with the decorative skin during said pressing has elevations for reinforcing static friction between the decorative skin and the slide.

5. The method according to claim 1, characterized in that the distance between the first molding tool element and the second molding tool element is increased during the foaming process until a resulting height of the hollow area corresponds to a thickness of the foam layer being produced.

6. The method according to claim 5, characterized in that the reverse side of the decorative skin is pressed by the slide against the lateral surface of the backing, and not against a lateral surface of the second molding tool element, as soon as the resulting height is reached.

7. The method according to claim 1, further comprising:
deaerating the hollow area while the foamable mixture is being added to the hollow area by displacing the slide to a withdrawn position or leaving the slide in a withdrawn position with respect to the first molding tool element and hollow space.

8. The method according to claim 1, wherein said pressing takes place prior to said increasing.

9. The method according to claim 1, wherein said pressing of the slide takes place horizontally along an upper surface of the first molding tool element, and said increasing takes place by moving the second molding tool element vertically away from the first molding tool element.

10. The method according to claim 1, wherein said pressing presses the slide against the visible surface of the decorative skin and presses the reverse side of the decorative skin against both of the lateral surface of the backing and a lateral surface of the second molding tool element.

11. The method according to claim 10, wherein the lateral surface of the second molding tool element slides out of contact with the reverse side of the decorative skin as a result of said increasing.

12. The method according to claim 1, wherein the slide is one of a plurality of slides arranged laterally around the hollow area, each of the slides being in an open or withdrawn position during said adding, with said pressing taking place subsequent to said adding, and with the slides remaining in the position provided by said pressing during said foaming and increasing steps.

* * * * *